United States Patent
Manger et al.

(10) Patent No.: US 6,729,797 B2
(45) Date of Patent: May 4, 2004

(54) TESTABLE SUMP APPARATUS

(75) Inventors: Peter E. Manger, Westchester, OH (US); James E. Kesterman, Cincinnati, OH (US); Michael T. McCann, Florence, KY (US); Tod W. Miller, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/219,102

(22) Filed: Aug. 15, 2002

(65) Prior Publication Data

US 2003/0033855 A1 Feb. 20, 2003

Related U.S. Application Data (60) Provisional application No. 60/312,624, filed on Aug. 15, 2001.

(51) Int. Cl.$^7$ ................................................. F17C 13/00
(52) U.S. Cl. ...................... 405/52; 405/129.45; 73/49.2; 220/560.03
(58) Field of Search .................. 405/129.45, 129.5, 405/129.55, 129.57, 129.75, 129.8, 129.85, 54, 55, 52; 73/37, 49.2; 220/560.03

(56) References Cited

U.S. PATENT DOCUMENTS

| | | | |
|---|---|---|---|
| 2,460,054 A | 1/1949 | Wiggins ..................... 220/565 |
| 3,813,923 A | 6/1974 | Pendleton .................. 73/49.2 |
| 3,995,472 A | 12/1976 | Murray ......................... 73/40 |
| 4,110,947 A | 9/1978 | Murray et al. ................. 52/249 |
| 4,490,072 A | * 12/1984 | Glasser ........................ 405/45 |
| 4,523,454 A | 6/1985 | Sharp ......................... 73/49.2 |
| 4,524,609 A | 6/1985 | Sharp ......................... 73/49.2 |
| 4,568,925 A | 2/1986 | Butts ........................... 340/605 |
| 4,607,522 A | 8/1986 | Sharp ......................... 73/49.2 |
| 4,653,312 A | 3/1987 | Sharp ......................... 588/259 |
| 4,787,772 A | * 11/1988 | Wagner ........................ 405/53 |
| 4,796,676 A | 1/1989 | Hendershot et al. .......... 141/83 |
| 4,871,078 A | 10/1989 | Sharp ........................... 405/53 |
| 4,932,257 A | 6/1990 | Webb ....................... 73/40.5 R |
| 5,000,342 A | * 3/1991 | Sharp ..................... 220/567.1 |
| 5,039,367 A | * 8/1991 | Sharp ......................... 156/169 |
| 5,054,645 A | * 10/1991 | Sharp ..................... 220/560.03 |
| 5,072,623 A | 12/1991 | Hendershot .................. 73/49.2 |
| 5,098,221 A | 3/1992 | Osborne ....................... 405/52 |
| 5,115,936 A | * 5/1992 | Bartlow ................... 220/567.1 |
| 5,117,677 A | 6/1992 | Hendershot et al. ......... 73/49.2 |
| 5,244,307 A | * 9/1993 | Wokas ......................... 405/53 |
| 5,257,652 A | 11/1993 | Lawrence .................... 141/86 |
| 5,295,760 A | 3/1994 | Rowe .......................... 405/52 |
| 5,308,423 A | * 5/1994 | Kauffman .................... 156/171 |
| 5,345,813 A | 9/1994 | Flessas ........................... 73/46 |
| 5,368,670 A | * 11/1994 | Kauffman .................... 156/171 |
| 5,400,646 A | 3/1995 | Kraus et al. ................. 73/49.2 |
| 5,568,449 A | 10/1996 | Rountree et al. ............. 367/99 |
| 5,589,631 A | * 12/1996 | Spring et al. ................. 73/49.2 |
| 6,551,024 B1 | * 4/2003 | Berg, Sr. et al. .............. 405/54 |

* cited by examiner

Primary Examiner—Robert E. Pezzuto
Assistant Examiner—Tara L. Mayo
(74) Attorney, Agent, or Firm—Dinsmore & Shohl LLP (57) ABSTRACT

A testable sump apparatus comprises a body wall including a first wall with a first wall portion and a second wall with a second wall portion. The first wall portion is spaced from the second wall portion to at least partially define a body wall interstitial space therebetween. The testable sump apparatus can optionally include at least one spacer located in the body wall interstitial space between the first wall portion and the second wall portion. The sump apparatus can also include an optional test port and an optional fitting mounted to the body wall adjacent the through hole. The fitting, if provided, can at least partially define a fitting interstitial space, wherein the fitting interstitial space may be in fluid communication with the body wall interstitial space.

32 Claims, 4 Drawing Sheets

TESTABLE SUMP APPARATUS

CROSS REFERENCE TO RELATED APPLICATIONS

This application claims the benefit of U.S. Provisional Application No. 60/312,624, filed Aug. 15, 2001.

TECHNICAL FIELD

This invention relates generally to a sump for storing liquids, and more particularly, to a testable sump to allow testing of the integrity of the sump.

BACKGROUND OF THE INVENTION

Service stations typically employ underground storage tanks to store fuel or other chemicals to be dispensed by an above ground dispensing station. Underground storage tanks and associated piping pose potential environmental and fire hazards as a breakdown of the integrity of the tank could result in fuel or other chemical leaks that can contaminate the surrounding environment.

U.S. Pat. No. 4,110,947 to Murray et al. discloses one system to monitor a storage tank installed underground. The storage tank includes inner and outer shells with a space between the shells for the purpose of monitoring pressure conditions and potential leakage in that space. The space between the inner and outer shells of the tank can be pressurized and thereafter monitored so that defects in the outer shell of the tank can be discovered by detecting a reduction in the pressure between the shells.

There is a continuing need to provide a dispenser sump wherein the integrity of the sump may be detected in an inexpensive manner to thereby minimize or even prevent environmental and/or fire hazards.

SUMMARY OF THE INVENTION

Accordingly, it is an object of the present invention to obviate problems and shortcomings of conventional sumps. More particularly, it is an object of the present invention to provide a dispenser sump that can be tested for structural integrity.

In accordance with the present invention, a testable sump apparatus is provided comprising a body wall including a first wall with a first wall portion and a second wall with a second wall portion. The first wall portion is spaced from the second wall portion to at least partially define a body wall interstitial space therebetween. The body wall may also define a through hole extending through the first wall and the second wall. At least one spacer can also be located in the body wall interstitial space between the first wall portion and the second wall portion. The sump apparatus can further include a fitting mounted to the body wall adjacent the through hole. The fitting, if provided, can at least partially define a fitting interstitial space, wherein the fitting interstitial space may be in fluid communication with the body wall interstitial space. A test port can also be included such that it is in fluid communication with at least one of the body wall interstitial space and the fitting interstitial space.

In accordance with still further aspects of the present invention, a testable sump apparatus is provided and comprises a body wall including a first wall with a first wall portion and a second wall with a second wall portion. The first wall portion is spaced from the second wall portion to at least partially define a body wall interstitial space therebetween. The sump apparatus can also include a plurality of spacers located in the body wall interstitial space between the first wall portion and the second wall portion. At least one of the plurality of spacers may be integrally molded with one of the first wall portion and the second wall portion. The testable sump apparatus can also include a test port in fluid communication with the body wall interstitial space.

In another embodiment, a testable sump apparatus is provided and comprises a body wall including a first wall with a first wall portion and a second wall with a second wall portion. The first wall portion is spaced from the second wall portion to at least partially define a body wall interstitial space therebetween. The sump can also include at least one spacer with a fluid permeable material located in the body wall interstitial space between the first wall portion and the second wall portion. The sump apparatus may further comprise a test port in fluid communication with the body wall interstitial space.

Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

Figure 1:
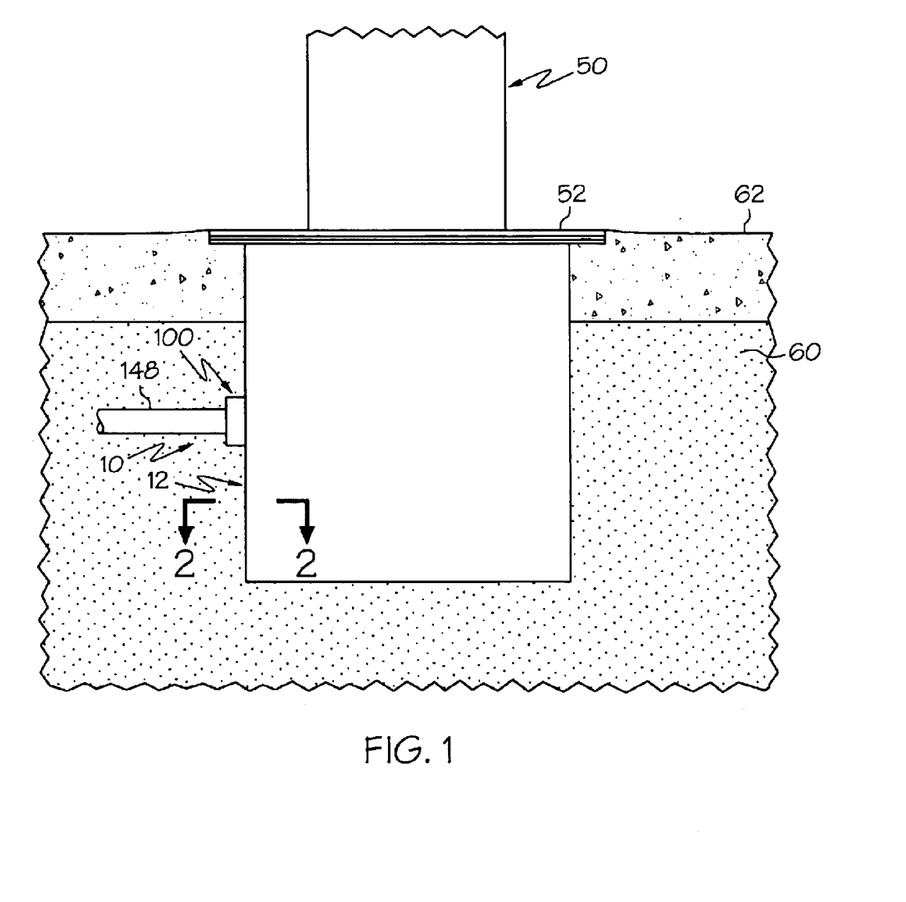
FIG. 1 is a partial elevational view of a testable sump apparatus in accordance with the present invention installed underground and adjacent to a dispensing station.

DETAILED DESCRIPTION OF EXEMPLARY EMBODIMENTS testable dispenser sump apparatus, can be installed underground such that a dispensing device 50 (in an exemplary application) can be mounted to a top plate 52 that can be bolted or otherwise removably attached to a body wall 12 of the testable sump apparatus 10. In one example, the testable sump apparatus 10 is seated underground with backfill 60 and topped with a concrete slab 62. For example, the slab 62 might be relatively thick (e.g., maybe ten inches deep to support vehicle traffic and the like) wherein the remaining backfill 60 further assists in anchoring the testable sump apparatus 10.

Figure 2:
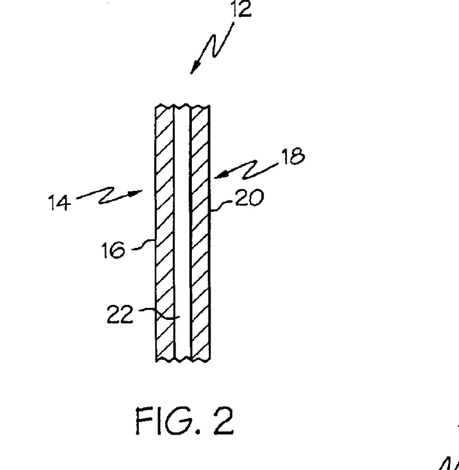
FIG. 2 is a partial sectional view of the body wall of the testable sump apparatus long section line 2—2 in FIG. 1.

As illustrated in FIG. 2, the body wall 12 of the testable sump apparatus 10 includes a first wall 14 including a first wall portion 16 and a second wall 18 with a second wall portion 20. The first wall portion 16 is spaced from the second wall portion 20 to at least partially define a body wall interstitial space 22 therebetween. As discussed more fully below, the body wall interstitial space 22 is capable of being pressurized or depressurized to permit the integrity and/or fluid tight seal of the body wall 12 to be tested and thereby determine the existence of potential body wall leaks. The dispenser sump body wall 12 could be formed from various alternative materials depending on the application. For example, the dispenser sump body wall 12 could comprise cross-linked vinyl ester, polyester, reinforced fiberglass, polyethylene, stainless steel or other metals, composite materials or the like. Various manufacturing methods could also be used to form the walls of the body wall. Exemplary methods might include Resin Transfer Molding ("RTM"), Sheet Molding Compound ("SMC"), or Bulk Molding Compound ("BMC") processes known in the industry.

Figure 2A:
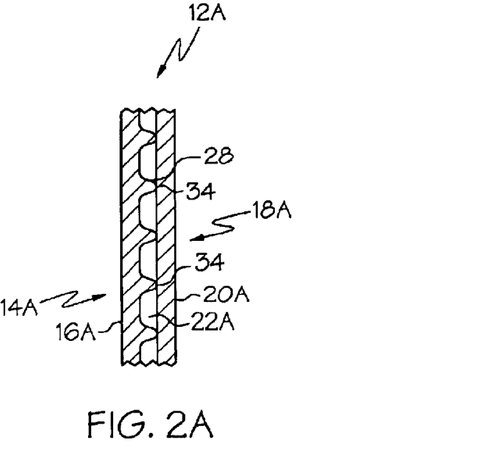
FIG. 2A is a partial sectional view of a body wall of a testable sump apparatus in accordance with another embodiment of the present invention.

FIGS. 2A–2D illustrate various alternative exemplary embodiments of a body wall, similar to the body wall illustrated in FIG. 2, that further includes at least one spacer as described more fully below. Each of the body walls illustrated in FIGS. 2 and 2A–2D may be used in accordance with the concepts of the present invention. FIG. 2A illustrates a body wall 12A with a first wall 14A including a first wall portion 16A and a second wall 18A including a second wall portion 20A. The first wall portion 16A is spaced from the second wall portion 20A to at least partially define a body wall interstitial space 22A therebetween. FIG. 2A illustrates a spacer, such as a plurality of ribs 28, being integrally molded with the first wall portion 16A. It will be understood, however, that each of the ribs 28 or other spacers could alternatively be integrally molded with the second wall portion 20A. In addition to the rib-like structures discussed throughout the application, it is contemplated that the spacer could comprise other structures such as protuberances, nubs, standoffs or other spacers. Providing all of the ribs or other spacers on one of the wall portions may reduce tooling expense as only one tool would require the intricacies necessary to integrally mold the ribs or other spacers with the corresponding wall portion. It may also be desirable to orient the ribs or other spacers such that they are substantially or effectively parallel with one another to prevent formation of isolated pockets between the wall portions. To further assist in movement of fluid within the interstitial space, also be desirable to orient the ribs or other spacers such that they are substantially or effectively parallel with one another to prevent formation of isolated pockets between the wall portions. To further assist in movement of fluid within the interstitial space, the ribs or other spacers could also be discontinuous and/or staggered. For example the spacers could be formed as a plurality of shorter elongated ribs offset from one another to limit or prevent channeling of the fluid within the interstitial space. In addition, orienting the ribs or spacers in the substantially vertical side wall in a substantially vertical manner may also allow the walls to be easily ejected or removed from the corresponding tools after forming the walls, for example, with a molding process. The number or ribs or other spacers can be varied according to strength requirements, material differences, applications, material and manufacturing costs and other preferences.

As discussed above, the ribs or other spacers could be integrally molded with one of the body wall portions. In addition, at least one or a plurality of the ribs 28 or other spacers may also be attached, for instance with an adhesive, to the other side wall portion. For example, as illustrated in FIG. 2A, all of the ribs 28 are integrally molded with the first wall portion 16A, wherein at least one or all of the ribs 28 can also be attached, for example, by connection of the tip(s) of at least one of the ribs 28 to the abutting surface of the second side wall portion 20A. Various alternative attachments or connection processes can be used to connect one or more of the ribs 28 or other spacers to the corresponding wall portion. For example, adhering with adhesives, mechanical interlocking (e.g., snapping connection, tongue and groove connection, hook and loop type fasteners etc.), thermal bonding, laser or sonic welding, or other techniques might be used to attach the ribs or other spacers to the corresponding side wall portion.

In one example, the ribs 28 or other spacers extending from the first wall portion 16A could be attached with an adhesive 34 to the second wall portion 20A. In still another example, the body wall 12A could be designed so that one of more of the ribs 28 or other spacers extending from the first wall portion 16A can be snapped or interlocked together with the second wall portion 20A. It will be appreciated that any embodiment of the present invention including ribs or other spacers can be attached using various techniques, as described above for example, to connect the ribs or other spacers to the corresponding wall portion. Attaching the ribs or other spacers to the other wall portion can serve to increase the structural rigidity and strength of the body wall with minimal expense.

Figure 2B:
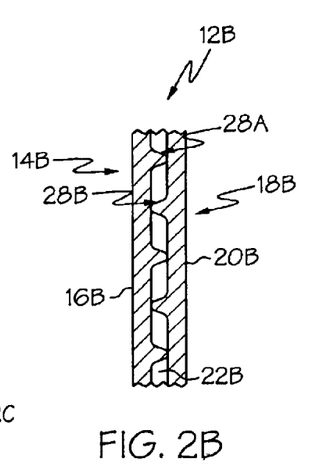
FIG. 2B is a partial sectional view of a body wall of a testable sump apparatus in accordance with still another embodiment of the present invention.

As illustrated in FIG. 2B, an alternative exemplary embodiment includes a body wall 12B including a first wall 14B with a first wall portion 16B and second wall 18B with a second wall portion 20B. The first wall portion 16B is spaced from the second wall portion 20B to at least partially define a body wall interstitial space 22B therebetween. As further illustrated in FIG. 2B, a plurality of ribs 28A or other spacers may be integrally molded with the first wall portion 16B while an additional plurality of ribs 28B or other spacers may be integrally molded with the second wall portion 20B. As illustrated in FIG. 2B, the ribs may be oriented in an alternating fashion, wherein one rib extending from one side wall portion is neighbored by a pair of ribs extending from the other side wall portion. However, it is understood that any arrangement, spacing, or orientation of the ribs or other spacers could be provided and therefore does not necessarily require an alternating relationship. To reduce the complexity of the molds, all of the ribs or other spacers may be provided on one side wall portion as illustrated in FIG. 2A and described above. However, the ribs or other spacers may be provided on each side wall portion in order to increase the rigidity and strength of the connection between the side walls as illustrated in FIG. 2B. While both first and second walls and the intervening spacer or spacers might also be formed as a single, unitary structure, it is believed that for cost and complexity reduction, the body wall will most often be provided as two connected pieces.

Figure 2C:
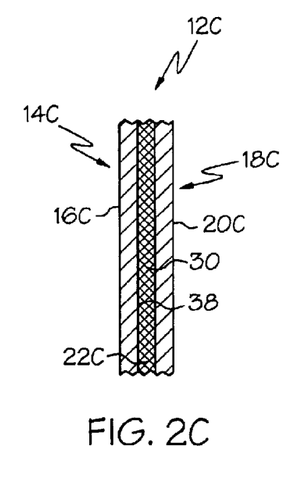
FIG. 2C is a partial sectional view of a body wall of a testable sump apparatus in accordance with yet another embodiment of the present invention.

FIG. 2C illustrates yet another exemplary embodiment of a body wall 12C, including a first wall 14C with a first wall portion 16C and a second wall 18C with a second wall portion 20C. The first wall portion 16C is spaced from the second wall portion 20C to at least partially define a body wall interstitial space 22C therebetween. As illustrated in FIG. 2C, at least one spacer may include a fluid permeable material 30. As illustrated in FIG. 2C, the spacer 30 could be attached, such as with an adhesive 38, to at least one of the first or second wall portion (16C, 20C). In one exemplary embodiment, the fluid permeable material 30 may comprise a porous material that allows fluid to pass therethrough while providing increased structural rigidity and/or strength to the body wall 12C. Many different types of materials could be used to form the fluid permeable material 30. For example, various alternative compounds and/or composites, could be used, and could include one or more of polyvinyl, polyethylene, polyester, polyurethane, polypropylene, polycarbonate, nylon, ceramic, fiberglass, PVC, acetyl or other porous material. The porous material could be formed with symmetrical pores (e.g., honeycomb structure) or could be formed with a nonsymmetrical or random porous arrangement. As will be understood, the spacer need only provide the required structural support to define and maintain the desired interstitial space while allowing for fluid pressure distribution throughout the interstitial space to facilitate testing.

Figure 2D:
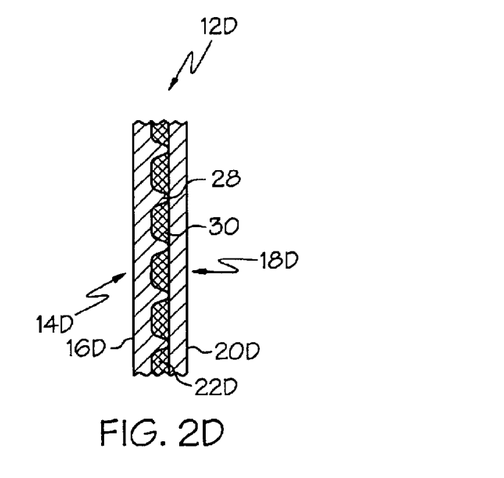
FIG. 2D is a partial sectional view of a body wall of a testable sump apparatus in accordance with another exemplary embodiment of the present invention.

FIG. 2D illustrates yet another embodiment of a body wall 12D in accordance with the present invention. The body wall 12D includes a first wall 14D with a first wall portion 16D and second wall 18D with a second wall portion 20D. The first wall portion 16D is again spaced from the second wall portion 20D to at least partially define a body wall interstitial space 22D therebetween. FIG. 2D illustrates a spacer including ribs 28 or other spacers, such as the ribs discussed in relation to FIG. 2A or 2B above, and a fluid permeable material 30, such as a fluid permeable material discussed in relation to FIG. 2C above. While the fluid permeable material 30 is illustrated in combination with a rib arrangement illustrated in FIG. 2A, it is understood that the fluid permeable material could be used with any arrangement of ribs or other spacers, such as the arrangement illustrated in FIG. 2B or otherwise, to thereby increase the strength the body wall 12. The exemplary embodiment illustrated in FIG. 2D provides a plurality of ribs 28 being integrally molded with the first wall portion 16D. In addition, fluid permeable material 30 may also be included within the interstitial space 22D and may be attached, for example with adhesive, to the first wall portion 16D, the second wall portion 20D, and/or the ribs 28. In addition, at least one or each of the ribs 28 or other spacers could be attached or otherwise adhered to the second wall portion 20D, for example as discussed above in regard to FIGS. 2A and 2B.

As illustrated in FIG. 2C, it is understood that the fluid permeable material 30 can be used as the spacer without additional spacers or ribs. Similarly, as illustrated in FIGS. 2A and 2B, the ribs (e.g., 28, 28A, 28B) can be used as the spacer without a fluid permeable material. Moreover, as illustrated in FIG. 2D, the spacer can comprise both a fluid permeable material 30 and an additional spacer, such as ribs 28. It will be appreciated that providing ribs, a porous material and/or other spacers between the first wall portion 16 and the second wall portion 20 will improve the strength and rigidity of the body wall 12 and thereby prevent inadvertent collapse of the walls relative to one another and while providing a lightweight body wall 12 capable of distributing fluid pressure throughout the interstitial space. Accordingly, the ribs, porous material and/or other spacers provide a strong rigid body wall that can also be tested to determine the integrity of the body wall.

Figure 4:
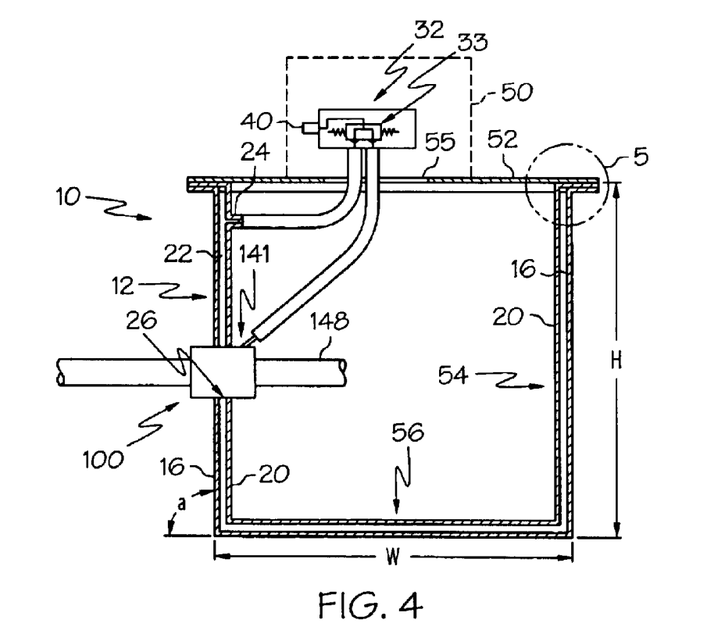
FIG. 4 is a sectional view of the testable sump apparatus of FIG. 1.

FIG. 4 illustrates a sectional view of a testable sump apparatus 10 of FIG. 1. As illustrated in FIG. 4, the body wall 12 includes at least one side wall 54 and a bottom wall 56. For example, the body wall 12 could be shaped with a rectangular closed-end shape wherein four side walls 54 extend upwardly from the bottom wall 56. As illustrated in FIG. 4, each side wall 54 might, but not necessarily, extends at an acute angle (a) from the bottom wall 56. Allowing the side wall 54 to extend at an acute angle relative to the bottom wall permits stacking or other nesting relationship between the shells prior to assembly and also facilitates ejection or removal of the wall from the molding apparatus after the wall is formed, for example with a molding process. It will be understood, however, that the angle (a) between each side wall 54 and the bottom wall 56 could also be a right angle or an obtuse angle.

The sump body wall 12 can be provided in many different shapes and sizes. In one example of a dispenser sump for petroleum distribution or the like, the sump body wall 12 could be provided with four sidewalls 54 extending along a vertical height (H) of about three feet, and a rectangular bottom wall 56 with a width (W) of about two feet and a depth (not shown) of about four feet. However, it is understood that other dimensioned sump body walls could be used and might even involve a single rounded sidewall 54 attached to a flat bottom wall 56 with a rounded perimeter.

Figure 5:
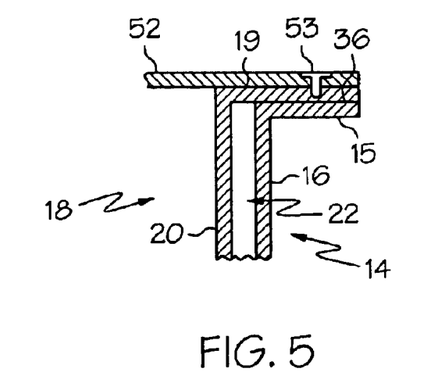
FIG. 5 is a partial, enlarged view of portions of the testable dispenser sump illustrated in FIG. 4.

As illustrated in FIG. 5, the first wall 14 of the body wall 12 can include an outwardly extending flange 15 while the second wall 18 includes an outwardly extending flange 19. The second wall 18 can be hung from the first wall 14 or otherwise attached wherein the flange 19 of the second wall 18 abuts against the flange 15 of the first wall 14. The flanges (15, 19) may be attached to one another, such as with an adhesive 36, to increase the strength of the connection between the wall portions and to provide a fluid tight seal for the body wall interstitial space 22. Thermal bonding or other mechanical attachment as mentioned above could also be used to connect the flanges (15, 19) together. As also illustrated in FIG. 5, the top plate 52 can be attached to the body wall 12 with removable fasteners 53, such as screws.

As further illustrated in FIG. 4, a fitting 100 is provided and can be mounted adjacent a through hole 26 extending through the first wall portion 16 and the second wall portion 20 to allow the pipe 148 to be inserted through the body wall 12 while maintaining the fluid tight integrity of the body wall 12. A conventional fitting may be adapted to assist in inserting the pipe 148 through the body wall 12. For example, exemplary fittings that may be adapted for use with the concepts of the present invention are disclosed by U.S. Pat. No. 5,345,813 to Flessas, the entire disclosure which is hereby incorporated herein by reference.

Figure 3:
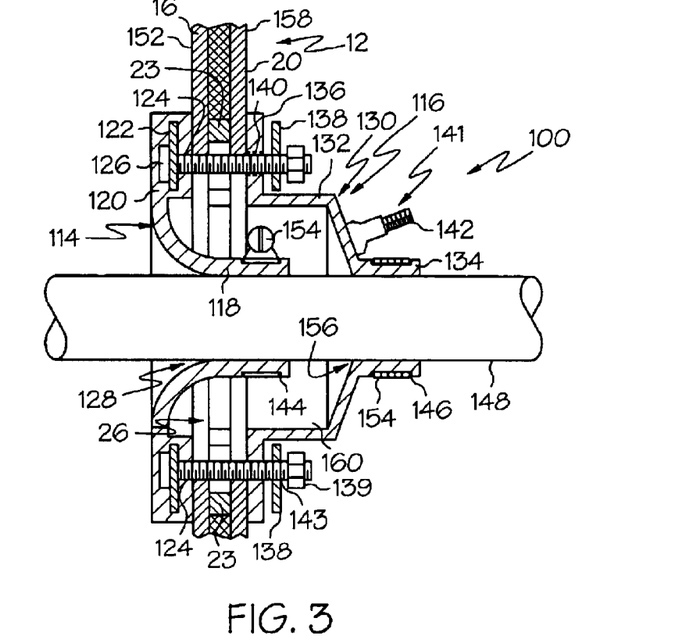
FIG. 3 is a partial sectional view of an exemplary fitting of a testable sump apparatus in accordance with the present invention.

FIG. 3 illustrates the details of an exemplary fitting 100 that may be used within the scope and concepts of the present invention. The fitting 100 illustrated in FIG. 3 includes an outer boot 114 and an inner boot 116. The boots 114 and 116 may be made of an elastomeric material that is flexible yet sturdy enough to withstand burial and resistance to corrosion from chemicals and fuels as well as mildew and fungus attack. For example, the material can comprise a thermoplastic elastomer. One such material meeting these specifications is melt processable rubber made by Dupont and sold under the name ALCRYN®. Polyethylene material can also be used, for example, with an elastomeric seal. It will be understood that other materials could also be used such as nitrile, also known as NBR. The outer boot 114 includes a main annular body 118 and a round rigid flange 120. The elastomeric round rigid flange 120 may be reinforced, such as by a steel ring 122 that can be encapsulated in the elastomeric material. A plurality of studs 124 can also be spaced about the ring 122. For example four or more studs 124 can be spaced an equal distance about the ring 122 and extend perpendicularly through the steel ring 122 and the flange 120. The heads 126 of the studs 124 as well as a small portion of each stud are also advantageously encapsulated in the elastomeric material in this example. The bolts have corresponding nuts 139 to allow the fitting to be clamped to the body wall 12. It will be understood, however, that the bolts could be threaded into a threaded anchor embedded or otherwise formed in the rigid flange 20, thereby eliminating any need for separate nuts 139 that might otherwise become detached or lost.

The boot 114 includes a center opening 128 through which the pipe 148 extends. The outer boot 114 also includes a groove 144 on the main body portion 118 adapted to receive a standard hose clamp 154.

The inner boot 116 includes a main annular body portion 130. The main body portion 130 includes a first section 132 having an inner diameter slightly larger than the outer diameter of the outer body portion 118 of the outer boot 114. A second section 134 of the main body portion has an inner diameter substantially equal to the inner diameter of the outer boot 114.

The first section 132 of the main body portion 130 includes an annular flange 136. The flange 136 includes a plurality of holes 140 adapted to receive the studs 124 extending from the outer boot 114 and through the body wall 12 when the fitting 100 is assembled. A steel reinforcement ring 138 may be provided such that it is adapted to fit over the main body portion 130 and abut the annular flange 136 in order to hold the flange 136 flush against the body wall 12 when assembled. The steel reinforcing ring 138 is also illustrated with punched holes 143 adapted to line up with extending studs 124 of the outer boot 114 when the testable flexible fitting 100 is assembled. The hex nuts 139 are used to threadably engage the studs in order to assemble the testable flexible fitting 100. The inner boot 116 also includes a groove 146 on the second section 134 of the main body portion 130 adapted to receive a standard hose clamp 154. As the function of the fitting attachment and sealing should be understood from this detailed example, other attachment and sealing arrangements could be easily substituted by those of ordinary skill in the art.

A sealable test port 141 of a type well known in the field is disposed on the first section 132 of the inner boot 116 to provide a fluid pathway into the area defined between the inner and outer boots. The test port 141 may be molded as part of the inner boot 116 or may be mechanically attached, for example, by tension or compression thread between the boot 116 and the test port 141. The test port 141 may have a threaded portion 142 adapted to connect to a conventional source of pressurized air. Alternatively, the threaded portion 142 may be connected to a conventional vacuum or underpressure source adapted to remove fluid from the fitting interstitial space 160.

As illustrated in FIGS. 3 and 4, the fitting 100 can be assembled to the body wall 12 wherein a pipe 148 extends therethrough. The body wall 12 is shown as including an opening through hole 26 that is slightly larger than the outer diameter of the pipe 148. The body wall 12 also includes a plurality of spaced holes adapted to receive the studs 124 extending from the outer boot 114. The pipe 148 extends through the center opening 128 and the outer boot 114 and the through hole 26 in body wall 12. The outer boot 114 is disposed such that the round rigid flange 120 abuts against the outer surface 152 of the first wall portion 16. The studs 124 extend through the holes in the body wall 12. A standard hose clamp 154 or other connector can be seated and tightened in the groove 144 on the body portion 118 of the outer boot 114 and around the pipe 148 forming an airtight seal between the outer boot 114 and the pipe 148. The inner elastomeric boot 116 is then disposed adjacent the body wall 12 so that the pipe 148 extends through the central opening 156 of the inner boot 116. In addition, the first section 132 of the main body portion overlaps and is spaced radially from the main body portion of the outer boot 114 in use. Annular flange 136 of the inner elastomeric boot 116 is disposed abutting the inner surface 158 of the second wall portion 20 and arranged so that the studs 124 extend through the holes 140 and the flange 136. The steel reinforcing ring 138 is arranged to abut the flange 136 and allow the studs 124 to extend through the holes 143 of the ring 138. The nuts 139 are threadably tightened on the studs 124 to seal the flange 136 against the inner surface 158 of the second wall portion 20 and to seal flange 120 against the outer surface 152 of the first wall portion 16.

The second section 134 of the main body portion 130 of the inner boot 116 is also shown as being sealed against the outer diameter of the pipe 148 by a standard hose clamp 154 positioned in the groove 146. In its assembled form, an air pocket or fitting interstitial space 160 is created in the fitting 100 in the area between the inner and outer boots.

As illustrated in FIG. 3, a seal 23, such as a donut or ring seal, may be positioned between the first wall portion 16 and the second wall portion 20, adjacent the through hole 26, to isolate the interstitial space 22 of the body wall 12 from the interstitial space 160 of the fitting 100 to permit independent testing of the interstitial spaces (22, 160) as described more fully below. A pressurizing or depressurizing apparatus may be attached to the test port 141 to test the integrity of the fitting 100 via pressure differences in order to determine whether there are leaks existing in the fitting 100. In a similar manner, and as illustrated in FIG. 4, a pressurizing or depressurizing apparatus may be connected to the test port 24 to test the integrity of the body wall 12. The test port 24 is similar in design and construction as that of the test port 141 and may be integrally formed with the wall portion, such as the second wall portion 20, or may be mechanically connected or threaded into the wall portion. Accordingly, by depressurizing or pressurizing the interstitial space 22 of the body wall 12, the integrity of the body wall 12 may be tested to determine the existence of any leaks in the body wall 12.

FIG. 4 further illustrates an optional manifold 32 that may be connected to the test port 24 of the body wall and/or the test port 141 of the fitting 100. As illustrated in FIG. 4, the manifold 32 may include a manifold test port 40 in fluid communication with both the test port 24 of the body wall 12 and the test port 141 of the fitting 100. Accordingly, the manifold test port 40 may be in fluid communication with both the interstitial space 22 of the body wall 12 and the interstitial space 160 of the fitting 100 at the same time. An apparatus (not shown) can then be connected to the manifold test port 40 to simultaneously pressurize or depressurize the interstitial spaces 22 and 160 to thereby determine the integrity of both the body wall 12 and the fitting 100. Since only one test is required for the entire system, the overall testing time and effort required to check the integrity of the dispenser sump apparatus 10 is reduced.

Figure 6:
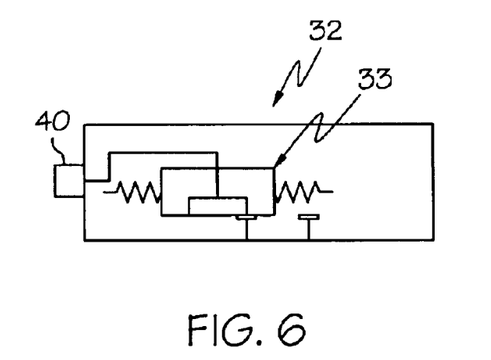
FIG. 6 is a schematic illustration of a manifold such as shown in FIG. 4, wherein the manifold test port is in fluid communication with the test port of the body wall and isolated from the test port of the fitting.
Figure 7:
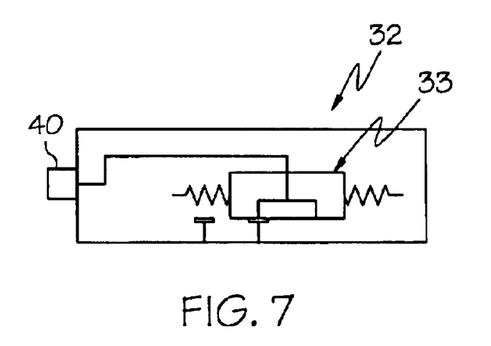
FIG. 7 is a schematic illustration of a manifold such as shown in FIG. 4, wherein the manifold test port is in fluid communication the test port of the fitting and isolated from the test port of the body wall.

The manifold 32 can also permit independent testing of the fitting 100 and the body wall 12. For example, the hoses (in communication with a corresponding one of the test ports 24, 141) could be removed from the manifold 32 and independently tested. Alternatively, the manifold 32 could be provided with a ball valve, lever or other device to allow independent testing of each test port. In one example, as illustrated in FIGS. 4, 6 and 7, the manifold 32 might include a valve 33 to isolate the interstitial spaces (22, 160) from one another. Normally, the valve 33 may be spring biased in the position illustrated in FIG. 4 wherein the manifold test port 40 is in fluid communication with both of the test ports (24, 141). If a leak is found in the system, the valve 33 may be moved to one of the positions illustrated in either FIG. 6 or FIG. 7 to individually test the components of the system. For example, the valve 33 could be moved to the position depicted in FIG. 6 to separately test the integrity of the body wall 12 or may be shifted to the position illustrated in FIG. 7 to separately test the integrity of the fitting 100. Such compartmentalized testing could be used to isolate leaks, make the testable sump apparatus more sensitive, and/or make corrective actions more efficient. It is understood that additional fittings or interstitial spaces, etc. could also be provided to test additional components or predetermines zones or interstitial spaces of the sump apparatus depending on the particular application, and that corresponding pressure chambers could also be attached to the manifold 32 for simultaneous measurement.

It is also understood the manifold 32 is optional and that it is possible to simply reach into an excess port 55 defined in the top plate 52 to individually connect with the test port 24 of the body wall 12 and/or the fitting test port 141 of the fitting 100 without the use of a manifold. Alternatively, the test ports (24, 141) could be connected to one another to allow simultaneous testing at another test port. The test ports (24, 141), for instance could be connected together with a fluid passage, such as a hose, wherein at least one of the ports allows for testing. Alternatively, the testable sump apparatus 10 could be assembled without the seal 23 to allow direct communication between the interstitial space 22 of the body wall 12 and the interstitial space 160 of the fitting 100. With this arrangement, only one test port (24, 141) would be required, and the integrity of the fitting 100 and body wall 12 could simultaneously be tested with either test port 24 or 141. This arrangement would also reduce the costs of materials since the sump apparatus 10 would only require one test port to pressurize or depressurize all interstitial spaces.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. A testable sump apparatus comprising:
   a) a body wall including a first wall with a first wall portion and a second wall with a second wall portion, the first wall portion being spaced from the second wall portion to at least partially define a body wall interstitial space therebetween; and
   b) a fitting including at least two portions at least partially defining a fitting interstitial space, wherein the fitting interstitial space is in fluid communication with the body wall interstitial space.

2. The testable sump apparatus of claim 1, further comprising a test port in fluid communication with at least one of the body wall interstitial space and the fitting interstitial space.

3. The testable sump apparatus of claim 1, wherein the body wall defines a through hole extending through the first wall and the second wall and the fitting is mounted to the body wall adjacent the through hole.

4. A testable sump apparatus comprising:
   a) a body wall including a first wall with a first wall portion and a second wall with a second wall portion, the first wall portion being spaced from the second wall portion to at least partially define a body wall interstitial space therebetween, the body wall defining a through hole extending through the first wall and the second wall;
   b) a plurality of spacers located in the body wall interstitial space between the first wall portion and the second wall portion;
   c) a fitting mounted to the body wall adjacent the through hole, wherein the fitting is adapted to allow a pipe to be inserted through the body wall; and
   d) a test port adapted for fluid communication with the body wall interstitial space and adapted for connection with a pressurization apparatus for pressurizing or depressurizing the body wall interstitial space.

5. The testable sump apparatus of claim 4, wherein the plurality of spacers comprises a plurality of ribs.

6. The testable sump apparatus of claim 5, wherein at least two of the plurality of ribs are substantially parallel to one another.

7. The testable sump apparatus of claim 4, wherein each integrally molded spacer is integrally molded with one of the first wall portion and the second wall portion.

8. The testable sump apparatus of claim 4, wherein the at least one of the plurality of spacers is attached to the other of the first wall portion and the second wall portion.

9. The testable sump apparatus of claim 4, wherein the at least one of the plurality of spacers is adhered to the other of the first wall portion and the second wall portion.

10. The testable sump apparatus of claim 4, wherein at least one of the plurality of spacers is integrally molded with one of the first wall portion and the second wall portion.

11. The testable sump apparatus of claim 4, wherein all spacers located in the body wall interstitial space comprise a fluid impervious material.

12. The testable sump apparatus of claim 4, wherein the fitting including at least two portions that at least partially define a fitting interstitial space.

13. The testable sump apparatus of claim 12, wherein the test port is further adapted for fluid communication with the fitting interstitial space.

14. The testable sump apparatus of claim 13, wherein the test port is adapted for simultaneous fluid communication with the body wall interstitial space and the fitting interstitial space.

15. The testable sump apparatus of claim 14, wherein the test port is further adapted for fluid communication with one of the body wall interstitial space and the fitting interstitial space while being isolated from the other of the body wall interstitial space and the fitting interstitial space.

16. The testable sump apparatus of claim 15, further comprising a manifold adapted to be selectively arranged in one of a first position wherein the test port is in simultaneous fluid communication with the body wall interstitial space and the fitting interstitial space, a second position wherein the test port is in fluid communication with the body wall interstitial space while being isolated from the fitting interstitial space, and a third position wherein the test port is in fluid communication with the fitting interstitial space while being isolated from the body wall interstitial space.

17. A testable sump apparatus comprising:
  a) a body wall including a first wall with a first wall portion and a second wall with a second wall portion, the first wall portion being spaced from the second wall portion to at least partially define a body wall interstitial space therebetween;
  b) at least one spacer including a fluid permeable material located in the body wall interstitial space between the first wall portion and the second wall portion;
  c) a fitting including at least two portions at least partially defining a fitting interstitial space; and
  d) a test port adapted for simultaneous fluid communication with the body wall interstitial space the fitting interstitial space.

18. The testable sump apparatus of claim 17, wherein the test port is further adapted for fluid communication with one of the body wall interstitial space and the fitting interstitial space while being isolated from the other of the body wall interstitial space and the fitting interstitial space.

19. The testable sump apparatus of claim 18, further comprising a manifold adapted to be selectively arranged in one of a first position wherein the test port is in simultaneous fluid communication with the body wall interstitial space and the fitting interstitial space, a second position wherein the test port is in fluid communication with the body wall interstitial space while being isolated from the fitting interstitial space, and a third position wherein the test port is in fluid communication with the fitting interstitial space while being isolated from the body wall interstitial space.

20. The testable sump apparatus of claim 17, wherein the fluid permeable material comprises a porous material.

21. A testable sump apparatus comprising:
  a) a body wall including a first wall with a first wall portion and a second wall with a second wall portion, the first wall portion being spaced from the second wall portion to at least partially define a body wall interstitial space therebetween;
  b) a fitting including at least two portions; at least partially defining a fitting interstitial space; and
  c) a test port adapted for simultaneous fluid communication with the body wall interstitial space and the fitting interstitial space.

22. The testable sump apparatus of claim 21, wherein the body wall defines a through hole extending through the first wall and the second wall and the fitting is mounted to the body wall adjacent the through hole.

23. The testable sump apparatus of claim 21, further comprising at least one spacer located in the interstitial space between the first wall portion and the second wall portion.

24. The testable sump apparatus of claim 23, wherein the spacer comprises a plurality of ribs.

25. The testable sump apparatus of claim 24, wherein at least two of the plurality of ribs are substantially parallel to one another.

26. The testable sump apparatus of claim 24, wherein at least one of the plurality of ribs is integrally molded with one of the first wall portion and the second wall portion.

27. The testable sump apparatus of claim 23, wherein the spacer is integrally molded with one of the first wall portion and the second wall portion.

28. The testable sump apparatus of claim 27, wherein the at least one spacer is attached to the other of the first wall portion and the second wall portion.

29. The testable sump apparatus of claim 27, wherein the at least an additional spacer is adhered to the other of the first wall portion and the second wall portion.

30. The testable sump apparatus of claim 23, wherein the at least one spacer comprises a fluid permeable material.

31. The testable sump apparatus of claim 21, wherein the test port is further adapted for fluid communication with one of the body wall interstitial space and the fitting interstitial space while being isolated from the other of the body wall interstitial space and the fitting interstitial space.

32. The testable sump apparatus of claim 31, further comprising a manifold adapted to be selectively arranged in one of a first position wherein the test port is in simultaneous fluid communication with the body wall interstitial space and the fitting interstitial space, a second position wherein the test port is in fluid communication with the body wall interstitial space while being isolated from the fitting interstitial space, and a third position wherein the test port is in fluid communication with the fitting interstitial space while being isolated from the body wall interstitial space.

* * * * *

UNITED STATES PATENT AND TRADEMARK OFFICE
CERTIFICATE OF CORRECTION

PATENT NO. : 6,729,797 B2
DATED : May 4, 2004
INVENTOR(S) : Peter E. Manger et al.

It is certified that error appears in the above-identified patent and that said Letters Patent is hereby corrected as shown below:

Column 11,
Line 22, insert -- and -- between "interstitial space" and "the fitting."
Line 47, delete ";".

Signed and Sealed this

Sixth Day of July, 2004

JON W. DUDAS
*Acting Director of the United States Patent and Trademark Office*